Nov. 13, 1956 R. E. THOMAS 2,770,684
LIMITED AMPLIFIER
Filed July 9, 1953
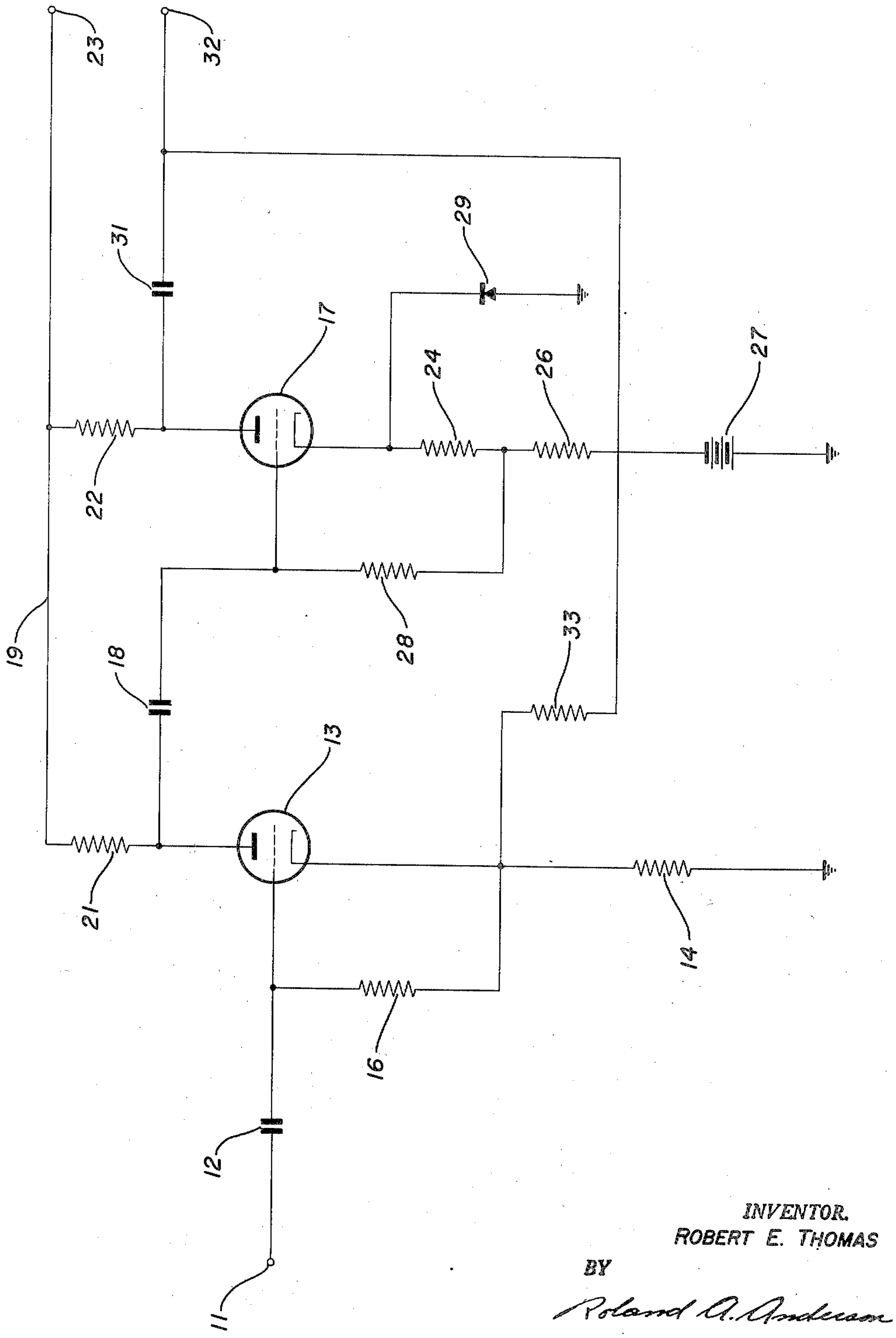
INVENTOR.
ROBERT E. THOMAS
BY
Roland A. Anderson
ATTORNEY.

United States Patent Office 2,770,684

Patented Nov. 13, 1956

2,770,684

LIMITED AMPLIFIER

Robert E. Thomas, Walnut Creek, Calif., assignor to the United States of America as represented by the United States Atomic Energy Commission Application July 9, 1953, Serial No. 366,919

1 Claim. (Cl. 179—171)

The present invention relates in general to an improvement in electronic amplifiers and more particularly to an improved limited amplifier adapted to prevent interstage blocking from overly large signals.

In the amplification of low voltage signals with conventional multistage amplifiers having capacitively coupled stages, the impression on the amplifier input of overly large voltages, such as noise signals, results in the amplifier being blocked and rendered inoperative for some period of time. This is caused by the control electrodes of the amplifying tubes drawing excessive current which thereby charges the interstage coupling capacitors to such a state that an appreciable period is required for same to discharge through the grid leak resistors. During the period that the coupling capacitor is heavily charged signals from a previous amplifier stage are not transmitted to the amplifier tube and the tube control electrode is maintained at the potential of the charged coupling capacitor so that the amplifier tube can not amplify incoming signals and the amplifier is blocked. While amplifiers designed to receive nominally high voltage input signals do not normally experience the above difficulty owing to the small likelihood of overshadowing spurious input signals, low level amplifiers adapted to amplify quite small voltages experience serious difficulty in this respect inasmuch as common noise signals have a voltage magnitude much in excess of the signals to be received.

Heretofore it has been considered to be one of the normal limitations of low voltage amplifiers that they would have a long dead time following noise signals of appreciable magnitude and would thus be only intermittently operable unless substantially no noise or other large signals were included in the amplifier input. The present invention operates to eliminate blocking of low level amplifiers by large input signals through the provision of means to maintain the amplifier tube control electrode at all times at a negative potential with respect to the tube cathode whereby amplifier tube grid current is limited so that overcharging of the interstage coupling capacitors is precluded. Although the control grid or electrode is maintained at a negative potential with respect to the tube cathode in the successive stages of the amplifier, the anode voltage swing is not materially affected and the tube current variation is not limited to that normally provided by the negative to zero grid voltage variation of the amplifier tube.

Accordingly, it is an object of the present invention to provide an improved limited amplifier.

It is another object of the present invention to provide an improved electronic amplifier including means preventing overcharging of interstage coupling capacitors.

It is a further object of the present invention to provide an improved low level amplifier maintaining the amplifier tube control electrodes negative with respect to the tube cathodes so that blocking of coupling capacitors is precluded.

Various other objects and advantages of the invention will become apparent to those skilled in the art from the following description of the invention taken together with the accompanying drawing wherein the sole figure is a wiring diagram of a preferred embodiment of the invention.

Considering now the elements and connections of a preferred embodiment of the invention and referring to the drawing, there is provided an input terminal 11 adapted for connection to an external signal source (not shown) and coupled through a capacitor 12 to the control electrode of a triode vacuum tube 13. The cathode of amplifier tube 13 is grounded through a resistor 14 and connected to the control electrode through a resistor 16. A second like amplifier tube 17 is provided with a capacitor 18 coupling the anode of first amplifier tube 13 and the control electrode of amplifier tube 17. The anodes of tubes 13 and 17 are connected to a positive voltage bus 19 through plate resistors 21 and 22 and bus 19 is adapted for connection at terminal 23 to an external power supply (not shown).

The cathode of second amplifier tube 17 is connected through a pair of serially connected resistors 24 and 26 to the negative terminal of a power supply 27, shown for convenience as a grounded battery. A grid leak resistor 28 is connected between the control electrode of amplifier tube 17 and the juncture of cathode resistors 24 and 26 and the cathode of tube 17 is grounded through a conventional crystal diode 29, such as a germanium crystal. This crystal 29 is oriented to readily conduct the flow of electrons toward the grounded side thereof, this herein being taken as the direction of maximum conductivity of the crystal. The output of the second stage amplifier tube 17 is coupled through a capacitor 31 to a terminal 32 that may comprise an output terminal or may be connected to a third amplifier stage like the second, above described. Degenerative feedback is provided by a connection between terminal 32 and the cathode of first amplifier tube 13 through a resistor 33.

Amplification is accomplished by the above-described circuit in much the same manner as in conventional amplifiers in that a negative signal, for example, impressed on input terminal 11 will, upon reaching the control electrode of tube 13, reduce the conduction thereof to raise the anode potential which in turn is impressed as a positive voltage pulse upon the control electrode of tube 17 whereby the anode potential of this tube drops and applies to the output terminal 32 an amplified negative voltage pulse proportional to the input pulse. Conventionally low level amplifiers of this type are easily blocked particularly in successive amplification stages by overly large input signals, for same cause the control electrodes to draw large currents which charge the interstage coupling capacitors and the necessarily large grid leak resistors prevent rapid dissipation of such charge.

The present invention operates to preclude overcharging of the interstage coupling capacitors and in this respect note the second amplifier stage wherein a circuit is provided from the negative terminal of battery 27 through resistors 26 and 24 and crystal 29 to ground. With a proper choice of potentials and resistance values a current will flow through this circuit as well as through the amplifier tube 17 so that the crystal and tube current both pass through resistors 24 and 26 to determine the bias voltage of the control electrode of tube 17. A negative grid bias will be seen to result from the above-described circuitry and a positive signal applied to the grid of tube 17 which increases the tube current merely varies the ratio of tube current to crystal current, as part of the electron current originally flowing through the crystal 29 then passes through the tube instead and the current through resistors 24 and 26 remains unchanged. As the cathode resistor current does not vary with normal grid signals the grid bias also remains unchanged as the grid is cathode biased and therefore the grid potential remains negative with respect to the cathode and the grid does not draw current. When the signal applied to the amplifier tube grid becomes sufficiently large all of the crystal current is drawn through the tube so that no current flows through the crystal and additional grid signal amplitude then increases not only the tube current but also the current through cathode resistors 24 and 26.

In addition to the above-described circuitry, there is further provided means for limiting the grid bias so that it may not become positive and the grid can not therefore draw an appreciable current as substantially no grid current flows until the grid becomes positively charged with respect to the cathode. Large grid signals above the amplitude required to cut off the crystal 29 will increase the grid potential or, in other words, decrease the grid bias to zero, at which point same is herein limited. The zero bias plate current of amplifier tube 17 is determined as from a tube manual or the like and the difference between this current and the normal or original current through the cathode resistors is determined as a difference current which when multiplied by the resistance value of cathode resistors 24 and 26 will give the cathode voltage swing from normal condition to the zero bias voltage condition. Inasmuch as the grid is connected in a cathode follower arrangement, at most unity amplification may result and the maximum allowable grid voltage variation is thus the calculated cathode voltage swing plus the original grid bias, i. e., the cathode resistor voltage can not vary more than the grid voltage variation by cathode follower principles. The grid signal is thus limited to this calculated maximum by limiting the size of the plate resistor 21 of first amplifier tube 13, for it is across this resistor that the grid signal is developed. With a maximum designed plate current of first amplifier tube 13 the desired maximum resistance value of plate resistor 21 may be readily calculated to limit the grid signal of the second amplifier tube 17 to the calculated maximum wherein substantially no grid current flows.

Consider an example wherein the cathode resistors 24 and 26 have resistance values of 120 ohms and 6800 ohms respectively and a normal tube state wherein 13 milliamperes of current flows through these resistors with the crystal current being 5 milliamperes and the tube current being 8 milliamperes, the grid bias thus being approximately minus 1.5 volts. With tubes 17 having a zero bias current of 20 milliamperes a 7 milliampere current increase would thus result between the normal state and zero bias state whereby the cathode potential would swing $.007(6800+120)=48.44$ volts. Add to this the original grid bias voltage of 1.56 volts and a resultant calculated maximum allowable grid signal of about 50 volts is obtained. The grid voltage variation is limited to this maximum value by employing a 5000 ohm plate resistor 21 for first amplifier tube 13 and biasing this tube to pass a maximum plate current of say 8.5 milliamperes which would give an output signal of 42.5 volts, well below the signal required to drive the grid of tube 17 positive with respect to the cathode thereof.

By the above-described means, the grid potential of the second and succeeding stages of low level amplifiers is limited to prevent same from becoming positive with respect to the tube cathode so that substantially no grid current flows to charge the coupling capacitors. While a certain amount of distortion is introduced into the circuit by the use of the crystals in the amplifier tube cathode circuits this is easily compensated by degenerative feedback shown as feeding a proportion of the output signal back into the cathode circuit of the first amplifier tube.

The present invention has been disclosed with respect to but a single preferred embodiment, however, it will be apparent to those skilled in the art that numerous modifications and variations thereof are possible within the spirit and scope of the invention and thus the invention is not to be limited except by the terms of the following claim.

What is claimed is:

A limited amplifier comprising a first vacuum tube having a plate and a plate resistor, a second vacuum tube having an anode, cathode and control grid, a positive potential supply, a negative potential supply, a plate resistor connecting the anode of said second tube to said positive potential supply, a crystal connected between ground and the cathode of said second tube, a pair of serially connected resistors connected between the cathode of said second tube and said negative potential supply whereby a current flows through said series resistors and crystal and through said second tube, a grid leak resistor connected between the control grid of said second tube and the juncture of said serially connected resistors whereby said control grid is biased negatively with respect to the cathode of said second tube, and a coupling capacitor connected between the plate of said first tube and the control grid of said second tube, the value of the plate resistor of said first tube being limited to a value such that the maximum voltage change therein is less than the change in voltage of the cathode of said second tube from initial condition to zero grid bias condition whereby substantially no grid current flows in said second tube and said coupling capacitor remains uncharged.

References Cited in the file of this patent

UNITED STATES PATENTS

| | | |
|---|---|---|
| 2,428,925 | Scantlebury | Sept. 30, 1947 |
| 2,583,345 | Schade | Jan. 22, 1952 |
| 2,631,198 | Parisoe | Mar. 10, 1953 |